United States Patent
Owen et al.

[11] Patent Number: 6,069,880
[45] Date of Patent: May 30, 2000

[54] METHOD AND APPARATUS FOR SCANNING OTHER FREQUENCY PILOT SIGNALS IN A CODE DIVISION MULTIPLE ACCESS COMMUNICATION SYSTEM

[75] Inventors: Scott M. Owen; Robbin D. Hughes, both of San Diego, Calif.

[73] Assignee: Qualcomm Incorporated, San Diego, Calif.

[21] Appl. No.: 08/858,246

[22] Filed: May 19, 1997

[51] Int. Cl.[7] .............................. H04B 7/216; H04Q 7/00; G08C 17/00
[52] U.S. Cl. ........................... 370/311; 370/331; 370/335
[58] Field of Search .................................... 370/328, 329, 370/331, 335, 342, 311; 455/515, 434, 442, 38.3, 62, 67.1, 343, 443, 455

[56] References Cited

U.S. PATENT DOCUMENTS

| | | | |
|---|---|---|---|
| 5,128,959 | 7/1992 | Bruckert | 375/1 |
| 5,299,228 | 3/1994 | Hall | 370/335 |
| 5,341,397 | 8/1994 | Gudmundson | 370/335 |
| 5,392,287 | 2/1995 | Tiedemann, Jr. et al. | 370/311 |
| 5,619,491 | 4/1997 | Panzer | 370/342 |
| 5,649,000 | 7/1997 | Lee et al. | 455/436 |
| 5,708,658 | 1/1998 | Sugita | 370/335 |

*Primary Examiner*—Chau Nguyen
*Assistant Examiner*—Soon-Dong Hyun
*Attorney, Agent, or Firm*—Philip R. Wadsworth; Tom Streeter

[57] ABSTRACT

A method and apparatus for detecting a pilot signal on a second frequency while monitoring a first frequency having an assigned paging slot and a plurality of non-assigned paging slots. The method comprises the steps of monitoring the assigned paging slot of the first frequency and scanning for the pilot signal on the second frequency during at least one of the non-assigned paging slots of the first frequency. If the pilot signal is detected while scanning the second frequency, the pilot signal is processed normally. The method also includes entering a sleep mode for a remainder of the non-assigned paging slots. In a preferred embodiment, scanning for the pilot signal on the second frequency occurs in a non-assigned paging slot immediately following the assigned paging slot. In an alternate embodiment, scanning for the pilot signal occurs in a non-assigned paging slot immediately preceding the assigned paging slot.

7 Claims, 3 Drawing Sheets

METHOD AND APPARATUS FOR SCANNING OTHER FREQUENCY PILOT SIGNALS IN A CODE DIVISION MULTIPLE ACCESS COMMUNICATION SYSTEM

BACKGROUND OF THE INVENTION

I. Field of the Invention

The present invention relates to digital wireless communication systems. More particularly, the present invention relates to a novel and improved method for scanning other-frequency pilot signals in a code-division multiple access (CDMA) communication system.

II. Description of the Related Art

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems." Other non-CDMA based digital standards include the time-division multiple access (TDMA) based Global System for Mobile Communications (GSM), and the U.S. TDMA standard TIA/EIA IS-54 series.

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or PCS telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in copending U.S. patent application Ser. No. 08/509,721, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels is described in more detail in the above referenced U.S. Pat. No. 5,103,459 and will not be discussed in detail herein.

The above standards and patents describe, among other things, the manner in which a mobile station is to execute a "handoff" between neighboring base stations as it travels between their respective geographic coverage areas. For example, in the CDMA-based standards IS-95 and J-STD-008, the base station sends a message to the mobile station listing many of the system parameters of its neighboring base stations, including such information as would assist the mobile station in executing an "autonomous" handoff between base stations. An autonomous handoff is one that is not initiated or directed by the base station, but rather is initiated by the mobile station itself.

An example of one such neighbor list message is the "Extended Neighbor List Message" of J-STD-008. When the base station sends an Extended Neighbor List Message to the mobile station, it uses the format of Table I.

TABLE I

| Field | Length (bits) |
| --- | --- |
| MSG_TYPE ('00001110') | 8 |
| PILOT_PN | 9 |
| CONFIG_MSG_SEQ | 6 |
| PILOT_INC | 4 |
| Zero or more occurrences of the following record: | |
| NGHBR_CONFIG | 3 |
| NGHBR_PN | 9 |
| SEARCH_PRIORITY | 2 |
| FREQ_INCL | 1 |
| NGHBR_BAND | 0 or 5 |
| NGHBR_FREQ | 0 or 11 |
| RESERVED | 0–7 (as needed) |

The above table is taken from Section 3.7.2.3.2.14 of J-STD-008, and indicates the various fields transmitted in an exemplary Extended Neighbor List Message. Of particular concern to the present invention are the following fields:

NGHBR_PN—the base station sets this field to the pilot PN sequence offset for this neighbor, in units of 64 PN chips; and NGHBR_FREQ—the base station sets this field to the CDMA channel number corresponding to the CDMA frequency assignment for the CDMA channel containing the paging channel that the mobile station is to search.

Thus, according to J-STD-008, the mobile station is given the frequency and PN offset of each neighboring base station. This gives the mobile station enough information to make a more focused search for neighbor pilots, rather than having to search all possible PN offsets on all possible CDMA frequency assignments. For example, the mobile station may keep a table of all the neighbors that were passed to it in the neighbor list message or extended neighbor list message. Such a table might resemble Table II below.

TABLE II

| PN Offset (chips) | Frequency |
|---|---|
| 12 | f(1) |
| 24 | f(1) |
| 48 | f(1) |
| 12 | f(2) |

With respect to "same-frequency neighbors," i.e. those that are on frequency f(1), the very nature of a CDMA modulation scheme allows a mobile station with a diversity receiver such as that described in the above-mentioned U.S. Pat. No. 5,109,390 to search for other pilot signals on the same frequency assignment, but having different PN offsets, while simultaneously continuing to demodulate any channel that it is already monitoring. In other words, a CDMA mobile station is typically able to search for the pilot signals of other base stations on the same frequency assignment, without interrupting transmission or reception of data with its original base station.

However, a significant problem remains with regard to acquiring "other-frequency neighbors," i.e. those that are on frequency f(2). Namely, if a neighboring base station's pilot is on a different frequency assignment, the mobile station is required to re-tune its synthesizer to that other frequency in order to receive and demodulate that other-frequency neighbor's pilot channel. During the time that it takes to re-tune, acquire, and determine whether that other-frequency neighbor is a good candidate for handoff, the mobile station is unable to either receive or transmit on its original frequency assignment. Clearly, this would cause undesirable problems such as missed information on the original frequency.

For example, suppose the mobile station has re-tuned its synthesizer to search for a particular other-frequency neighbor's pilot signal during the time that an incoming page addressed to the mobile station is being transmitted by the original base station. In such a case, the mobile station would miss the page, and therefore could not complete an incoming call. Furthermore, this would be undetectable by the mobile station's user, who would never be aware that he had missed an incoming call because the mobile station had temporarily re-tuned to the other frequency.

What is needed is a method and apparatus for scanning other-frequency neighbors which avoids missing incoming messages from the original base station.

SUMMARY OF THE INVENTION

The present invention is a novel and improved method and apparatus for detecting a pilot signal on a second frequency while monitoring a first frequency having an assigned paging slot and a plurality of non-assigned paging slots. The method comprises the steps of monitoring the assigned paging slot of the first frequency and scanning for the pilot signal on the second frequency during at least one of the non-assigned paging slots of the first frequency. If the pilot signal is detected while scanning the second frequency, the pilot signal is processed normally. The method also includes entering a sleep mode for a remainder of the non-assigned paging slots. In a preferred embodiment, scanning for the pilot signal on the second frequency occurs in a non-assigned paging slot immediately following the assigned paging slot. In an alternate embodiment, scanning for the pilot signal occurs in a non-assigned paging slot immediately preceding the assigned paging slot.

The apparatus of the present invention may be used in a wireless communication receiver, referred to herein as a mobile station. The apparatus includes a searcher receiver for monitoring the assigned paging slot of said first frequency and a searcher controller for retuning the searcher receiver to the second frequency and scanning for the pilot signal on the second frequency during at least one of the non-assigned paging slots. The searcher receiver processes the pilot signal if the pilot signal is detected. Furthermore, the searcher controller causes the wireless communication receiver to enter a sleep mode for a remainder of the non-assigned paging slots.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a spread-spectrum CDMA communication system such as those described in the above-mentioned patents and standards, a paging channel is used to communicate certain information from the base station to the mobile station. In a typical CDMA communication system, the mobile station, after power-up initialization and registration with the base station, begins to monitor the paging channel, and perform various other housekeeping functions. This state is generally referred to as the mobile station idle state, and is further described in, for example, J-STD-008 section 2.6.2, entitled "Mobile Station Idle State."

The base station transmits various paging channel messages to the mobile station over the paging channel. There are four major types of messages: overhead, paging, order, and channel assignment. One of the overhead messages is the Neighbor List Message, or Extended Neighbor List Message described above. Paging messages include the Page Message which contain a page to one or more mobile stations. Pages are usually sent when the base station receives a call for the mobile station. Orders are used from everything from acknowledging registration to locking or preventing an errant mobile station from transmitting. The channel assignment message allows the base station to assign a mobile station to the traffic channel, change its paging channel assignment, or direct the mobile station to use another communication system.

The paging channel has a special mode called a "slotted mode." In this mode, messages for a particular mobile station are sent only in certain pre-defined slots which occur at certain predefined times. Through the registration process, the mobile station can specify the slots that it will receive to the base station. These slots can occur from once every 2 seconds to once every 128 seconds. This capability allows a mobile station, which is operating in this slotted mode, to partially power-down during slots other than its pre-defined slot. The order of messages in a paging channel slot is also arranged so that, in most cases, a mobile station will only have to receive a portion of the slot. The protocol tells the mobile station when all messages for slotted mobile stations using the slot have been transmitted. These techniques provide a very powerful method by which a battery-operated mobile station can conserve a considerable amount of battery energy when idle. Various techniques for power saving during slotted idle mode are described in U.S. Pat. No. 5,392,287, issued Feb. 21, 1995, entitled "APPARATUS AND METHOD FOR REDUCING POWER CONSUMPTION IN A MOBILE COMMUNICATIONS RECEIVER", and U.S. Pat. No. 5,509,015, issued Apr. 16, 1996, entitled "METHOD AND APPARATUS FOR SCHEDULING COMMUNICATION BETWEEN TRANSCEIVERS," both of which patents are assigned to the assignee of the present invention, and both of which patents are incorporated herein by reference.

Figure 1:
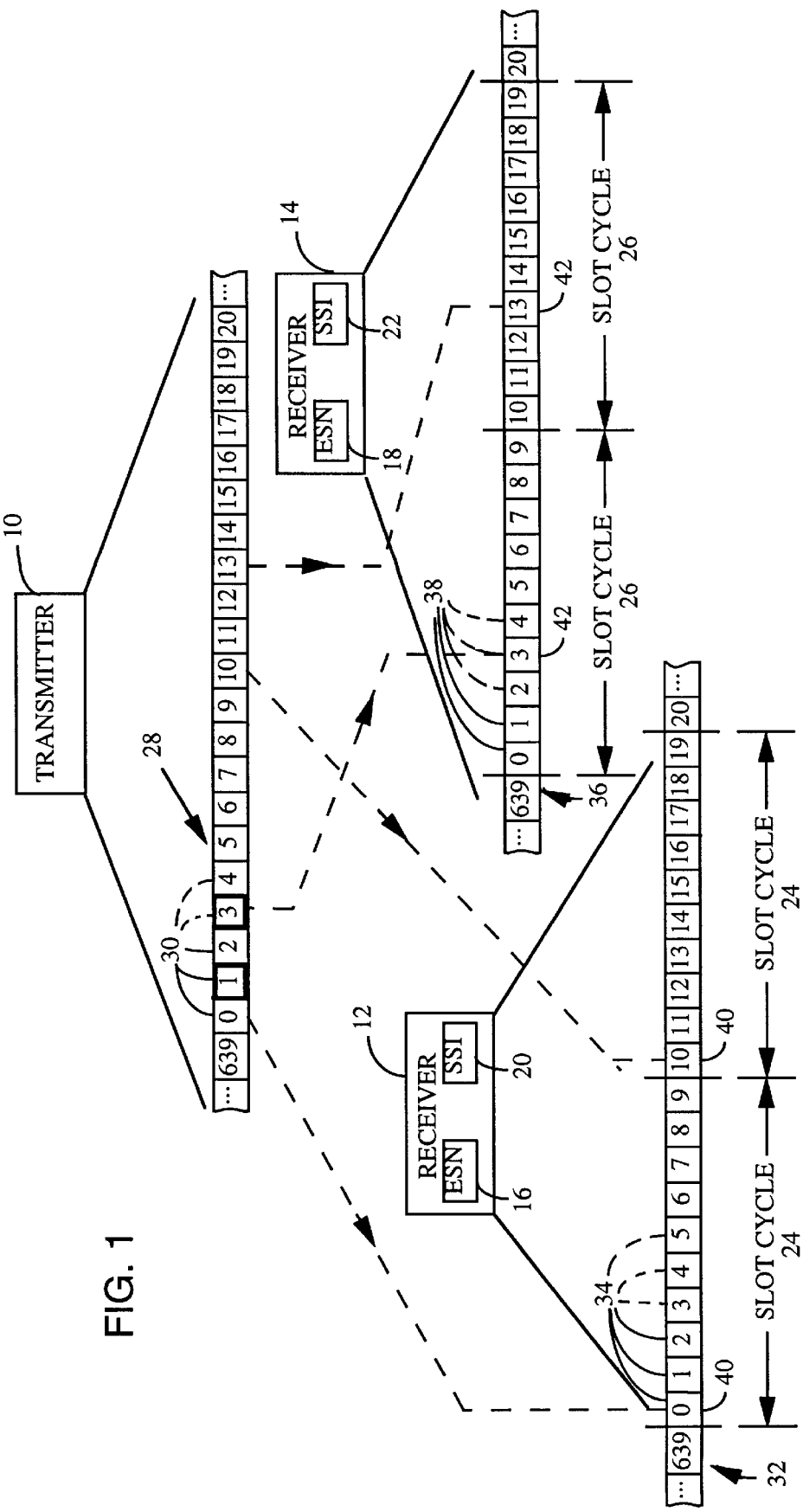
FIG. 1 is a diagram of a typical slotted paging scheme for use with the present invention.

A typical slotted paging scheme is shown in FIG. 1. In FIG. 1, a transmitter 10 may send messages to two receivers 12 and 14. Other embodiments may have a greater or lesser number of receivers. In a digital cellular telephone system such as discussed in the above-referenced U.S. Patents and copending applications, transmitter 10 is disposed in a base station or cell site (not shown) and transmits messages to receivers 12 and 14, disposed in mobile stations (not shown). The mobile stations may be cellular telephones or personal communications system (PCS) handsets.

The base station transmits these messages, which may provide the mobile station with an indication of an incoming telephone call with a requirement to take special control actions, or with updated system parameters, on the paging channel. The paging channel transmissions are represented by the broken lines in FIG. 1.

Receivers 12 and 14 have 32-bit electronic serial numbers (ESN) 16 and 18, respectively. The ESN of each receiver is different from that of all other receivers. In a cellular telephone system, a call to a cellular telephone is routed to a mobile telephone switching office (MTSO, not shown). The MTSO in turn routes the call to a base station within transmitting range of the mobile station. Either the MTSO or the base station includes means for converting the telephone number of the cellular telephone into the mobile station ESN.

During a mobile station initialization or "registration" as it is known in the cellular communications art, or at other times as required, receivers 12 and 14 each select a slot cycle index 20 and 22 respectively. Slot cycle indices 20 and 22 determine the length of the slot cycles 24 and 26 of receivers 12 and 14 respectively. A processor in a mobile station may select a slot cycle index using an algorithm or it may use a predetermined value. For example, both slot cycle indices 20 and 22 have the value "1" in FIG. 1. A range of 1–7 is preferred for slot cycle indices 20 and 22. Thus, the maximum slot cycle index, MAX_SSI is "7." In a cellular telephone system, each mobile station transmits the slot cycle index selected by its receiver to the base station, which requires this information to access the receivers.

Receivers 12 and 14 compute slot cycles 24 and 26, which are $5 \times 2^{(slot\ cycle\ index\ 20)}$ and $5 \times 2^{(slot\ cycle\ index\ 22)}$ slots in length respectively. Transmitter 10 generates timing 28, which comprises a stream of periodic slots 30. Similarly, receiver 12 generates timing 32, which comprises a stream of periodic slots 34, and receiver 14 generates timing 36, which comprises a stream of periodic slots 38. Slots 30, 34, and 38 are equal in length and are preferably 200 milliseconds (ms) in length. Thus, using a range of slot cycle indices of 1–7 in the above function yields a range of slot cycles of between 10 and 640 slots in length, which corresponds to a time range of between 2 and 128 seconds using 200 ms slots.

Receiver 12 monitors the channel during an assigned slot 40, which occurs once in each slot cycle 24. Receiver 14 monitors the channel during an assigned slot 42, which occurs once in each slot cycle 26. Assigned slots 40 and 42 are pseudorandomly selected to facilitate their even distribution among the slots of a slot cycle having a given length.

As previously described, during slots other than its assigned slot 42, receiver 14 may power down much of its circuitry in order to conserve battery energy. The present invention provides a method and apparatus by which the receiver 14 or 12 may scan other frequencies for other-frequency neighbor's pilot signals during times other than its assigned slot. In this way, the mobile station employing a receiver 14 or 12 of the present invention may avoid missing page messages on the paging channel, while advantageously scanning other frequencies as necessary, and still maximizing the amount of battery conservation between assigned slots.

Figure 2:
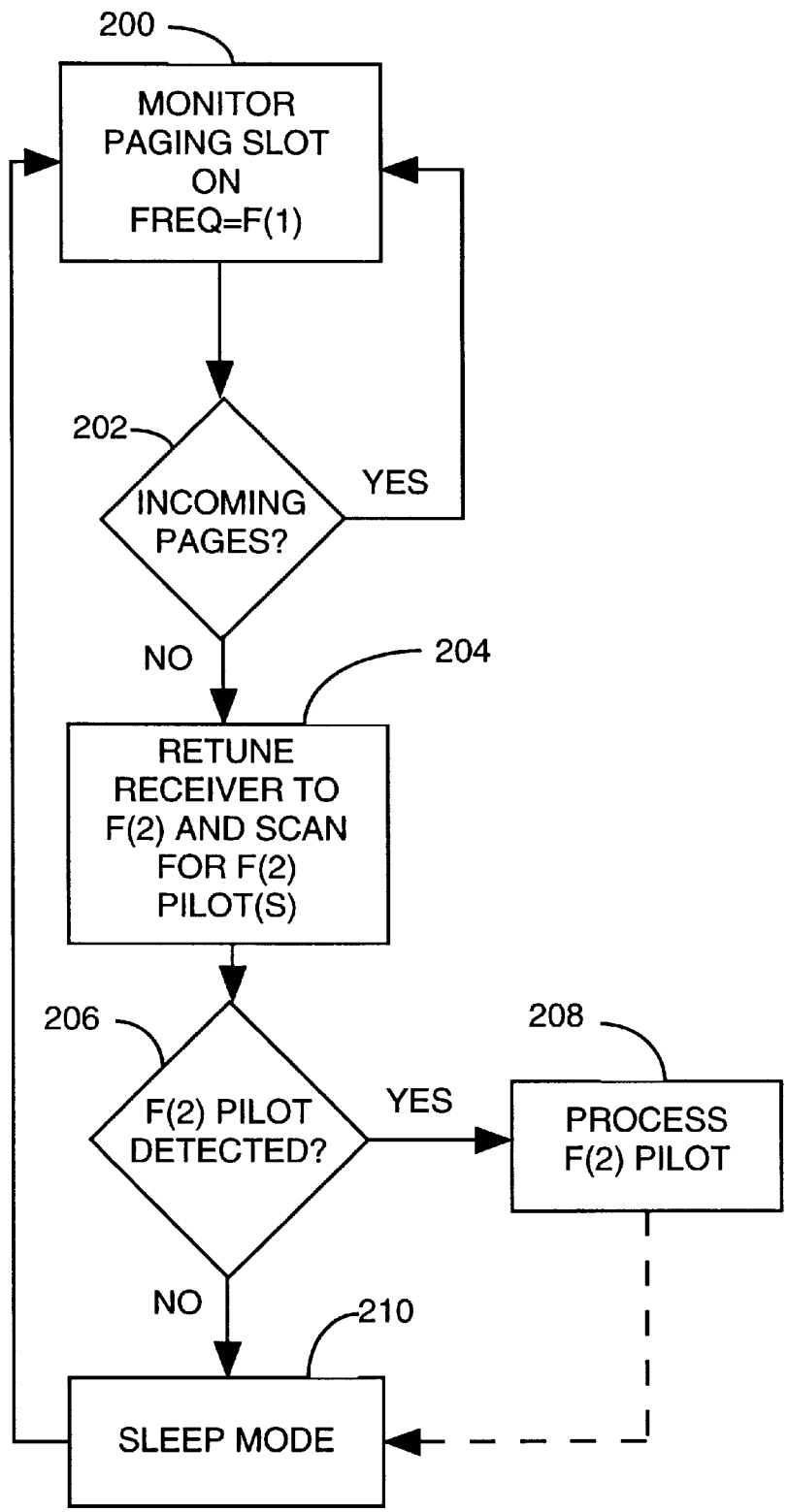
FIG. 2 is a block diagram of the method of the present invention.

FIG. 2 illustrates a simplified block diagram of the present invention. The process of the present invention begins with the mobile station receiver, such as receiver 12 of FIG. 1 in idle mode. That is to say that the mobile station receiver is not actively engaged in a communication with the base station, and is performing normal housekeeping functions and monitoring its assigned paging slot 40 on its assigned frequency, f(1), corresponding to the base station transmitter 10 with which it is currently registered. This beginning state is represented by block 200 of FIG. 2. While receiver 12 is monitoring its assigned paging slot 40 on its assigned frequency, f(1), it is also continuously searching for same-frequency neighbors according to a predetermined schedule. For example, recalling TABLE II above, the receiver 12 continues to scan (as described below with reference to FIG. 3) for the same-frequency neighbor pilots that may be operating with the exemplary PN offset of 12, 24, or 48 PN chips as shown in TABLE II.

As long as there may be incoming pages, as determined at decision 202, the receiver 12 continues to monitor its assigned paging slot 40 on its assigned frequency, f(1), in block 200. If, however, the base station indicates that there are no pages for the mobile station, the mobile station then retunes its receiver to frequency f(2) during a non-assigned slot and scans (as described below with reference to FIG. 3) for the other-frequency neighbor pilots in block 204. Alternatively, the mobile station may retune to frequency f(2) during its assigned slot if a general page is received from the base station along with an indication that there are no more pages to follow in that assigned slot. Using the example neighbor list of TABLE II above, the receiver 12 may scan for the other-frequency pilot signal which is operating on f(2) using an exemplary PN offset of 12 PN chips.

If the other-frequency pilot signal on frequency f(2) is detected at decision 206, then the receiver 12 processes the f(2) pilot in accordance with normal procedures as described in the above referenced patents. This may include treating the f(2) pilot's base station as a candidate for an autonomous inter-frequency handoff, or merely continuing to monitor and report on its detected energy level. If the f(2) pilot's base station is considered as a candidate for autonomous inter-frequency handoff, then it may subsequently execute a handoff as described in the above-referenced patents and standards. If the f(2) pilot's base station is not considered as a candidate for an autonomous inter-frequency handoff, then the mobile station may enter the sleep mode as described in the above-referenced U.S. Pat. No. 5,392,287, by partially powering down much of its circuitry in block 210 after it has processed the f(2) pilot signal in block 208. This possible transition is indicated by the dashed line between blocks 208 and 210 in FIG. 2.

If, however, the f(2) pilot is not detected in decision 206, the receiver 12 may enter a sleep mode as described in the above-referenced U.S. Pat. No. 5,392,287, by partially powering down much of its circuitry in block 210. The receiver 12 will remain in the sleep mode of block 210 until the next occurrence of its assigned slot 40, at which time it will return to block 200 to monitor its assigned slot 40 on the original frequency f(1).

In the preferred embodiment, the receiver 12 retunes to frequency f(2) during the non-assigned slot immediately after its assigned slot 40. For example, receiver 12 preferably retunes to frequency f(2) during slots numbered 1, 11, 21 . . . of FIG. 1. Alternately, the receiver 12 may retune to frequency f(2) during the non-assigned slot immediately before its assigned slot 40. In that case, receiver 12 would retune to frequency f(2) during slots numbered 639, 9, 19 . . . of FIG. 1. In other embodiments, receiver 12 retunes to frequency f(2) in any non-assigned slot.

As can be seen from the above discussion of FIGS. 1 and 2, the receiver 12 will not miss any pages from the base station transmitter 10, and yet will still be able to scan for other-frequency neighbor pilots in order to perform autonomous inter-frequency handoff.

Now, with reference to FIG. 3, the apparatus of the present invention will be discussed. The apparatus of FIG. 3 implements the method of FIG. 2. Specifically, the method of FIG. 2 is controlled by software running in searcher controller 58 of FIG. 3, which may be a microprocessor or microcontroller or other controller as is known in the art.

As was previously mentioned with reference to the above-referenced patents, a pilot signal is used to synchronize a mobile station in phase and frequency to the transmissions of a base station. In the exemplary embodiment, the spread spectrum communication system is a direct-sequence spread spectrum communication system. Examples of such systems are discussed in U.S. Pat. Nos. 5,056,109 and 5,103,459. In a direct-sequence spread spectrum communication system, the transmitted signals are spread over a frequency band greater than the minimum bandwidth necessary to transmit the information by modulating a carrier wave by the data signal, then modulating the resulting signal again with a wideband spreading signal. In a pilot signal, the data can be looked at as an all ones sequence.

The spreading signal is typically generated by a linear feedback shift register, the implementation of which is described in detail in the aforementioned patents. The spreading signal can be viewed as a rotating phasor of the form:

$$s(t) = Ae^{-\omega t + \phi} \qquad (1)$$

In order to acquire, the mobile station must synchronize to the received signals from the base station in both phase, $\phi$, and in frequency, $\omega$. The object of the searcher operation is to find the phase of the received signal, $\phi$. After finding the phase of the spreading signal, $\phi$, the frequency is found in using a demodulation element that has hardware for both phase and frequency tracking. The method by which a mobile finds the phase of the received signal is by testing a set of phase hypotheses, referred to as a window and determining if one of the hypothetical phase hypotheses, also referred to as offset hypotheses, is correct. An example of a searcher receiver operating with "window" style searches is given in copending U.S. patent application Ser. No. 08/509,721, filed Jul. 31, 1995, entitled "METHOD AND APPARATUS FOR PERFORMING SEARCH ACQUISITION IN A CDMA COMMUNICATION SYSTEM", assigned to the assignee of the present invention and incorporated herein by reference. Further information on an apparatus that may be used for search acquisition is given in copending U.S. patent application Ser. No. 08/317, 177, filed Sep. 30, 1994, entitled "MULTIPATH SEARCH PROCESSOR FOR A SPREAD SPECTRUM MULTIPLE ACCESS COMMUNICATION SYSTEM," assigned to the assignee and incorporated herein by reference.

Upon power up, a spread spectrum signal is received at antenna 82. The objective of the apparatus shown in FIG. 2 is to gain synchronization between PN sequences generated by PN sequence generator 60 and the received spread spectrum signal which is spread by identical PN sequences of unknown phase.

In the exemplary embodiment, both the means at the base station (not shown) that spreads the pilot signal and PN generator 60 are a maximal length shift register which generate the PN code sequences for spreading and despreading the pilot signal respectively. Thus, the operation of obtaining synchronization between the codes used to despread the received pilot signal and the PN spreading code of the received pilot signal involves determining the time offset of the shift register.

The spread spectrum signal is provided by antenna 82 to searcher receiver 44. Searcher receiver 44 downconverts the signal and provides the signal to despreading element 46. Despreading element 46 multiplies the received signal by the PN code generated by PN generator 60. Due to the random noise-like nature of the PN codes the product of the PN code and the received signal should be essentially zero except at the point of synchronization.

Searcher controller 58 provides an offset hypothesis to PN generator 60. In the exemplary embodiment, the received signal is modulated by quadrature phase shift keying (QPSK), so PN generator provides a PN sequence for the I modulation component and a separate sequence for the Q modulation component to despreading element 46. Despreading element 46 multiplies the PN sequence by its corresponding modulation component and provides the two output component products to coherent accumulators 48 and 50.

Coherent accumulators 48 and 50 sum the product over the length of the product sequence. This product sequence may be of an arbitrary length of PN chips referred to as a "search window" which is defined by a PN offset hypothesis (i.e. the start point of the search) and a search duration (i.e.

a "width" of the search window). Coherent accumulators 48 and 50 are responsive to signals from searcher controller 58 for resetting, latching and setting the summation period. The sums of the products are provided from summers 48 and 50 to squaring means 52. Squaring means 52 squares each of the sums and adds the squares together.

The sum of the squares is provided by squaring means 52 to non-coherent combiner 54. Noncoherent combiner 54 determines an energy value from the output of squaring means 52. Noncoherent accumulator 54 serves to counteract the effects of a frequency discrepancy between the base station transmit clocks and the mobile station receive clock and aids in the detection statistic in a fading environment. If one knows that the frequency of the two clocks is exactly the same and that there are no deep fades then the ideal approach is to integrate the sequence over the entire accumulation period in the form:

$$E = \left(\sum_{n=1}^{N} I(n)PNI(n)\right)^2 + \left(\sum_{n=1}^{N} Q(n)PNQ(n)\right)^2 \quad (2)$$

where PNI(n) and PNQ(n) can be ±1.

If, however, there is a probability of frequency mismatch or fading, then the correlator sacrifices some of its detection statistic in order to have a more robust correlation technique of the form:

$$E = \sum_{k=1}^{M} \left\{ \left(\sum_{n=1}^{N} I(n + (k-1)N) \cdot PNI(n + (k-1)N)\right)^2 + \left(\sum_{n=1}^{N} Q(n + (k-1)N) \cdot PNQ(n + (k-1)N)\right)^2 \right\} \quad (3)$$

Searcher controller 58 provides the value M to noncoherent accumulator 54.

Noncoherent accumulator 54 provides the energy signal to comparison means 56. Comparison means 56 compares the energy value to predetermined thresholds supplied by searcher controller means 58. The results of each of the comparisons is then fed back to searcher controller 58. Search controller 58 examines the comparisons and determines whether the window contains likely candidates for the correct offset. Searcher controller 58 tunes searcher receiver 44 to frequency f(1) when scanning for same-frequency pilots and monitoring the assigned paging slot in block 200 of FIG. 2. Searcher controller also retunes searcher receiver 44 to the frequency f(2) and repeats the above-described steps during scans for other-frequency pilots on f(2) in block 204 of FIG. 2.

Figure 3:
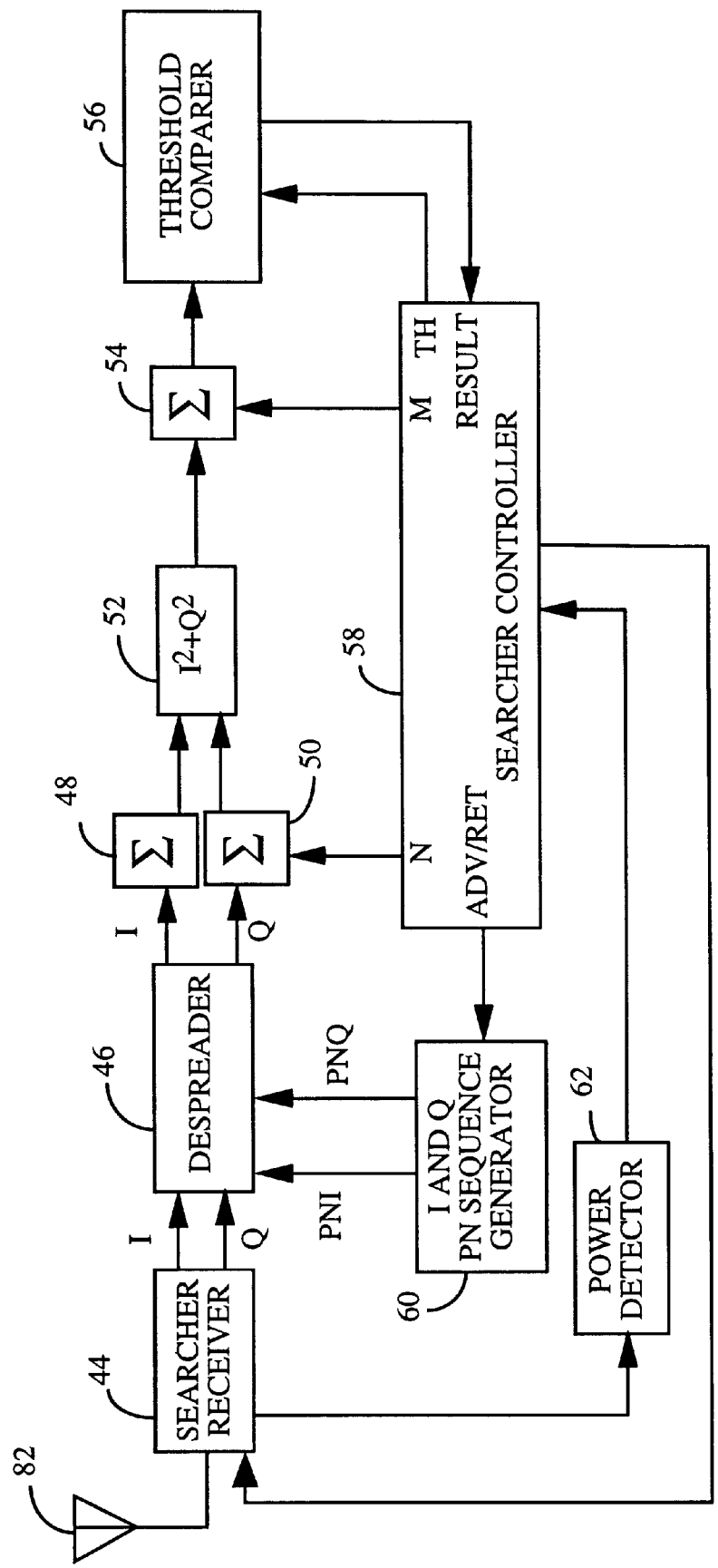
FIG. 3 is a block diagram of the apparatus of the present invention.

Thus, the apparatus of FIG. 3 performs the scanning of both the same-frequency neighbors and the other frequency neighbors under control of searcher controller 58 and in accordance with the method of FIG. 2. Thus, the present invention provides a method and apparatus that will not miss any pages from the base station transmitter 10, and yet will still be able to scan for other-frequency neighbor pilots in order to perform autonomous inter-frequency handoff. Also, the present invention still maximizes the amount of battery energy conserved by the mobile station because it returns to a sleep mode for the non-assigned slots in which it is not scanning for other-frequency neighbor pilots.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for detecting a pilot signal on a second frequency while, in the same slot cycle, monitoring a first frequency having an assigned paging slot and a plurality of non-assigned paging slots, the method comprising the steps of:

monitoring said assigned paging slot of said first frequency;

scanning for said pilot signal on said second frequency during at least one of said non-assigned paging slots of said first frequency;

processing said pilot signal if said pilot signal is detected during said scanning step; and entering a sleep mode for a remainder of said non-assigned paging slots.

2. The method of claim 1 wherein said scanning step includes the step of retuning to said second frequency.

3. The method of claim 2 wherein said step of scanning for said pilot signal occurs in a non-assigned paging slot immediately preceding said assigned paging slot.

4. The method of claim 2 wherein said step of scanning for said pilot signal occurs in a non-assigned paging slot immediately following said assigned paging slot.

5. An apparatus in a wireless communication receiver for detecting a pilot signal on a second frequency while, in a same slot cycle, monitoring a first frequency having an assigned paging slot and a plurality of non-assigned paging slots, the apparatus comprising:

a searcher receiver for monitoring said assigned paging slot of said first frequency; and a searcher controller for retuning said searcher receiver to said second frequency and scanning for said pilot signal on said second frequency during at least one of said non-assigned paging slots of said first frequency;

wherein said searcher receiver processes said pilot signal if said pilot signal is detected during said scanning and causes said wireless communication receiver to enter a sleep mode for a remainder of said non-assigned paging slots.

6. The apparatus of claim 5 wherein said searcher controller scans for said pilot signal in a non-assigned paging slot immediately preceding said assigned paging slot.

7. The apparatus of claim 5 wherein said searcher controller scans for said pilot signal in a non-assigned paging slot immediately following said assigned paging slot.

* * * * *